United States Patent [19]  [11] 3,859,347
Deutsch  [45] Jan. 7, 1975

[54] METHOD OF FORMING GLYOXYLIC ACID SEMICARBAZONE

[76] Inventor: Daniel H. Deutsch, 1355 Cresthaven Dr., Pasadena, Calif. 91105

[22] Filed: June 8, 1972

[21] Appl. No.: 261,025

[52] U.S. Cl. ............................. 260/534 R, 260/554
[51] Int. Cl. ............................................. C07c 33/04
[58] Field of Search ................................. 260/534 R

[56] References Cited
UNITED STATES PATENTS
2,779,786  1/1957  Coleman et al. ................ 260/534 R Primary Examiner—Vivian Garner

[57] ABSTRACT

A method of forming glyoxylic acid semicarbozone by reacting a cyanate with a neutralized hydrazine solution for a period of time, followed by either addition of glyoxylic acid of adjusting the pH and adding chloral whereby a solid semicarbazone product is precipitated.

6 Claims, No Drawings

METHOD OF FORMING GLYOXYLIC ACID SEMICARBAZONE 6-azauridine triacetate has been previously described and utilized as a drug which is particularly useful in the treatment of psoriasis. 6-azauridine triacetate is prepared from 6-azauridine (6-azauracil riboside) by acetylation in accord with practices developed in the prior art. The 6-azauridine starting material to form the triacetate has been described in U.S. Pat. No. 3,468,759 as being formed from 6-azauracil by a fermentation process. In turn, various methods have been described in the prior art for formulating the starting 6-azauracil. Perhaps the most effective process for forming 6-azauracil comprises the cyclization of glyoxylic acid semicarbazone. Thus, this semicarbazone is a valuable starting material in the synthesis of 6-azauracil which in turn is utilized to form valuable drug products through additional reactions.

One obvious method of forming glyoxylic acid semicarbazone involves the reaction of glyoxylic acid and semicarbazide. Glyoxylic acid is relatively expensive and thus the cost of the desired semicarbazone is quite expensive. Another reported method for forming a semicarbazone is by heating chloral and semicarbazide hydrochloride in an aqueous solution. Once again, in this instance, the semicarbazide hydrochloride is an expensive starting material and thus serves to add substantially to the cost of the semicarbazone to be formed. It should be apparent that if the semicarbazone is expensive as a starting material for forming the 6-azauracil then the price of the resulting products, or drugs produced, will reflect same. A reduction in the cost of any intermediate or starting material in the formation of such products is valuable in making the resulting item more economically feasible.

Briefly, the herein invention comprises a new method for preparing glyoxylic acid semicarbazone utilizing inexpensive ingredients such that the resulting semicarbazone will have a reduced price as compared to that manufactured in prior art technique. In accord with the herein process, potassium cyanate is reacted with a neutralized hydrazine solution for a period of several hours. The solution is then reacted with either glyoxylic acid or chloral. When chloral is used, the pH of the solution is adjusted prior to addition of the chloral. In both instances, a precipitate of the semicarbazone is formed from the reactions. It is believed that the invention will be further understood from the following description and examples.

To form the glyoxylic acid semicarbazone, a neutral aqueous solution of hydrazine is first prepared. The amount of hydrazine in the solution can range from 1 to 30 weight percent. It is generally preferred that the solution contain about 10 percent hydrazine. Added to the neutral hydrazine solution is a cyanate. Preferably, potassium cyanate is utilized. Since alkali metal cyanates are somewhat unstable in water, particularly potassium cyanate, it is desirable to have a small excess over that stoichiometrically required for the reaction involved. Thus, it is preferable to have from 5-25 weight percent excess of the cyanate. The third additional ingredient initially added to the reaction is an acid. Though hydrochloric acid is preferred, other mineral acids, such as sulfuric and phosphoric acids can be utilized. Additionally, weak acids are contemplated such as acetic and formic acid, though they are not as preferred. The acid could be any convenient strength or concentration. However, there must be at least 1 mole equivalent of acid for each mole of cyanate utilized, as can be readily apparent from the following equation between the three reactants to form the semicarbazide.

(1)
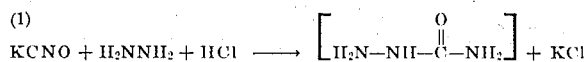

The above reaction 1 forms, as can be seen, an intermediate semicarbazide in solution. As will be seen, one of the advantages of the herein invention is to utilize a solution of the semicarbazide formed in reaction 1 above without the need for isolating the semicarbazide prior to forming the desired product. The above reaction to form the intermediate semicarbazide can be carried out from 4 to 24 hours at room temperature. It has generally been found that the reaction is completed in 8 hours. The completion of the reaction is dependent on temperature, time and concentration of reactants. The time of reaction can be reduce significantly by raising the temperature of the reaction to within the range of 50° to 70° C, but reaction temperatures between 10° and 80° C may be used.

The solution formed in reaction 1 above can then be utilized in one of two ways, in accord with the herein invention. In a first approach, glyoxylic acid is added to the mixture in an amount to stoichiometrically react with the semicarbazide. Once the acid is dissolved in solution, a new precipitate starts to form almost at once. The reaction is complete when no more precipitate forms which is in the range of from 15 minutes to 2 hours. The precipitate which crystallizes out, is the desired glyoxylic acid semicarbazone. The temperature of the reaction with the glyoxylic acid can vary from room temperature to near the boiling point of water. After the reaction, the mixture should be cooled to at least room temperature to ensure a good yield. The reaction with the glyoxylic acid to form the desired semicarbazone is seen from reaction 2 below.

(2)
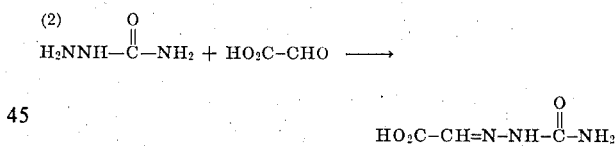

The second approach utilizing the solution formed in reaction 1 above, eliminates the requirement for glyoxylic acid which is a relatively expensive ingredient. In this method, the solution of the intermediate semicarbazide of reaction 1 is treated with further acid to bring the pH within the range of 5 to 7. This step of acid addition is preferred in order to assure that the further reaction required to form the desired semicarbazone will achieve a good yield of a pure material. The acidified solution is preferably cooled to room temperature before the next step which is extremely exothermic. After cooling to room temperature, chloral is then added in a stoichiometric amount equivalent to semicarbazide present.

(3)
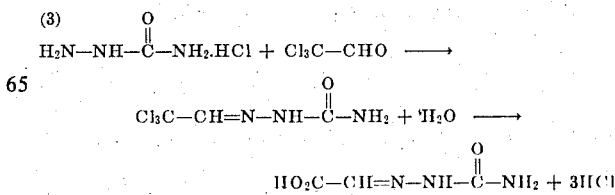

The mixture is then stirred as it is initially in two phases, and heated with a bath set in a range of 70°–90° C under reflux conditions. After approximately ½ hour, the reflux mixture should be cooled quickly in order to assure obtaining a pure and colorless product. Preferably, the mixture should be chilled to below room temperature for at least a half hour in order to ensure high yield of the product. It is believed that the invention will be further understood from the following specific examples.

EXAMPLE I

Into a 125 ml. Erlenmeyer flask was placed 2.9 mls. of 54.4% aqueous hydrazine solution, 50 mls. of water, 4.2 mls. of 12 N hydrochloric acid, and last, 4.9 gms. of practical grade potassium cyanate. A clear solution was obtained. The solution was allowed to stand at room temperature for 1¾ hours, and then 4.6 gms. of glyoxylic acid monohydrate was added. The acid quickly dissolved and a new precipitate started forming almost at once. After standing for 30 minutes, the precipitate was collected and washed with approximately 60 mls. of water. The solid was air dried to yield 5.0 gms. of white product which was glyoxylic acid semicarbazone.

The melting point of the product was 207°–209° C compared with 207°–209° C for a known sample. Thin layer chromatography using Silufol UV 254 ascending in Butanol: Acetic Acid: Water, 8:2:2 gave a single spot indistinguishable from a known sample and with an $R_f$ of 0.59.

EXAMPLE II

Into a 250 ml. Erlenmeyer flask was placed, in order, 5.8 mls. of 54.4% aqueous hydrazine solution, 100 mls. of water, 8.4 mls. of 12 N hydrochloric acid, and then 8.9 gms. of practical grade potassium cyanate. A clear solution formed with slight warming. The solution was allowed to stand for 2 hours and ten minutes at room temperature. 8.4 ml. of 12 N hydrochloric acid was added to the solution followed by 10 ml. of chloral and the mixture heated on a water bath set at 82° C. The inside temperature rose to the bath temperature in 6 minutes and a precipitate started forming. After a total of 28 minutes, the reaction mixture was cooled in an ice bath for 20 minutes and then the precipitate was collected, washed with cold water, methanol and air dried. Yield, 7.0 gms. of first crop material. A second crop, 0.6 gms. formed in the mother liquors on standing overnight.

The main crop had a melting point of 205°–207° C compared to 207°–209° for a standard sample. Thin layer chromatography using Silufol UV 254. ascending in Butanol:Acetic Acid:Water, 8:2:2 gave a single spot of $R_f$ 0.60 indistinguishable from that of a known sample.

I claim:

1. A method of forming glyoxylic acid semicarbazone comprising:
   mixing an alkali metal cyanate an aqueous neutral hydrazine solution having a hydrazine concentration of from 1 to 30 weight percent, said cyanate being present in an amount of about 5 to 25 weight percent excess with respect to said hydrazine, and at least one mole equivalent of an acid for each mole of said alkali metal cyanate,
   reacting the mixture at from 10° to 80° C to form an intermediate semicarbazide in solution,
   adding about one mole of glyoxylic acid for each mole of said intermediate semicarbazide to the mixture and holding the resulting mixture at from room temperature to about 100° C whereby the semicarbazone is precipitated.

2. The method of claim 1 wherein: said cyanate is potassium cyanate.

3. The method of claim 1 wherein said aqueous neutral hydrazine solution has a concentration of about 10% by weight hydrazine.

4. The method of claim 1 wherein said cyanate and hydrazine are reacted at a temperature of from about 50° C to about 70° C.

5. The method of claim 1 wherein said acid is selected from the group consisting of hydrochloric acid, sulfuric acid, phosphoric acid, acetic acid and formic acid.

6. The method of claim 5 wherein said acid is hydrochloric acid.

* * * * *